March 2, 1937.   R. E. MARBURY   2,072,717
PROTECTIVE DEVICE FOR CAPACITORS
Filed Sept. 26, 1935
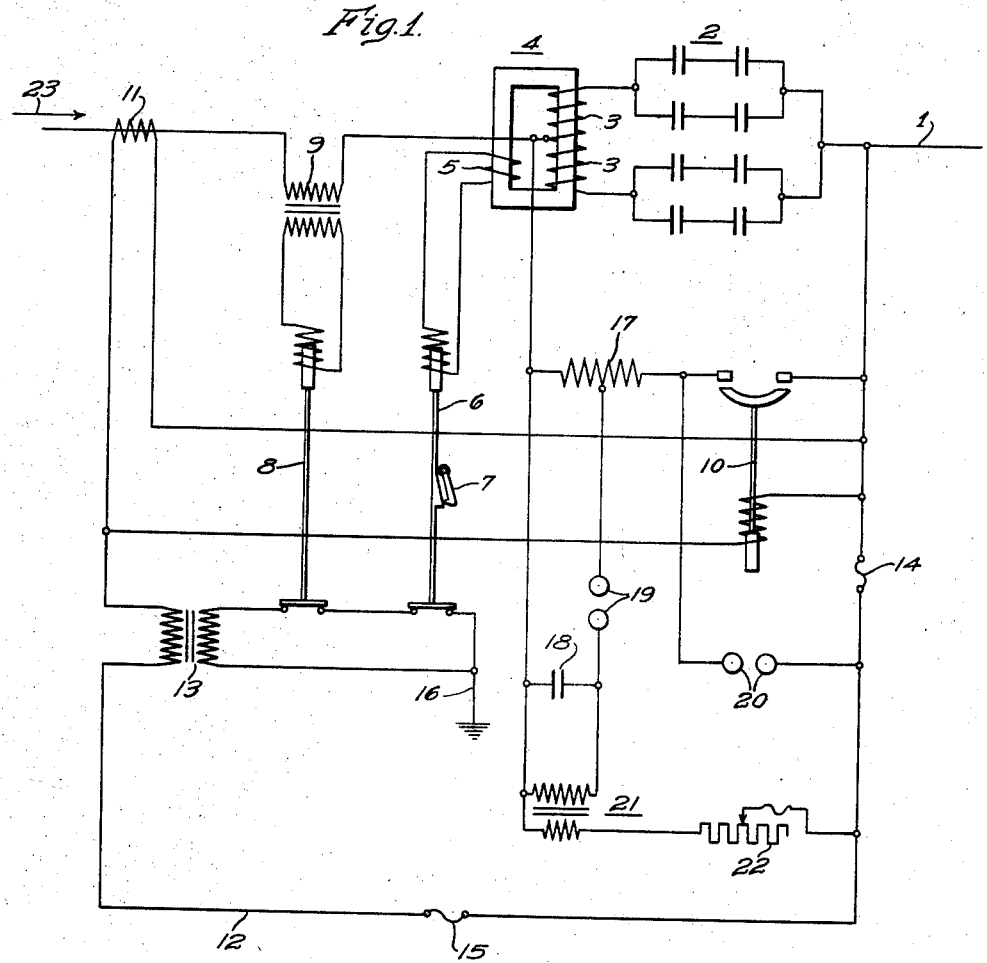
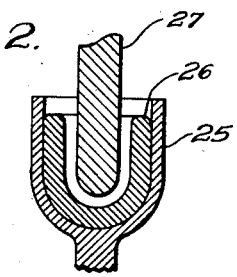
WITNESSES:
C. J. Weller
G. O. Harrison
INVENTOR
Ralph E. Marbury.
BY
ATTORNEY Patented Mar. 2, 1937

2,072,717

UNITED STATES PATENT OFFICE 2,072,717

PROTECTIVE DEVICE FOR CAPACITORS

Ralph E. Marbury, Wilkinsburg, Pa., assignor to Westinghouse Electric & Manufacturing Company, East Pittsburgh, Pa., a corporation of Pennsylvania Application September 26, 1935, Serial No. 42,182

15 Claims. (Cl. 175—294)

My invention relates to protective devices for electrical apparatus such as capacitors, and particularly to overvoltage and overcurrent protective devices for such apparatus, as used in systems of electrical transmission and distribution. Although my invention is useful in power systems of any type in which a capacitor or other electrical element is traversed by alternating currents of variable magnitude, it is particularly applicable to constant voltage alternating-current circuits provided with series capacitors for the compensation of line drop.

In series capacitor installations, as used for line drop compensation, the inductive reactance of the line is completely or partially neutralized by the capacitive reactance of the series capacitor so as to minimize the effective impedance of the line. In the event of a short circuit beyond the capacitor installation the current in the line and through the capacitor may reach values of 10 to 25 times normal full load, with corresponding increase in the operating voltage of the capacitor, as the latter voltage is proportional to line current. If the capacitor is chosen of sufficient voltage rating to withstand these momentary overvoltages, the cost per k. v. a., which increases as the square of the voltage, becomes prohibitive. In order to avoid such uneconomical operation of the capacitors, it is necessary to shunt the series capacitor during line fault conditions so as to greatly reduce or eliminate the series impedance of the installation, until the short circuit is cleared. The more effectively this is accomplished the lower will be the cost per k. v. a. of the capacitor.

The ideal condition is reached when the capacitor, may be selected, as to voltage rating, on the basis of its normal full-load working condition, and the overvoltages limited by some form of shunting device, to values within the limits which standard capacitors are designed to withstand. For example, consider a capacitor unit costing $n$ dollars, which has a voltage rating of 460 volts and is designed to withstand 530 volts continuously. If a shunting device is provided for immediately shunting the unit in the event of an overvoltage of 530 volts or less, the unit may be operated at its rated voltage of 460 volts. However, if a spark gap adjusted to break down at 2000 volts is provided for protection, the 460 volt unit could not be safely operated, and it would be necessary to provide a unit of higher voltage rating such as a 1760 volt unit, which would be operated, however, at the same full load voltage drop of 460 volts. The cost of the 1740 volt unit would be approximately—

$$\left(\frac{1740}{460}\right)^2 n$$

or $14.3n$ dollars; more than 14 times the cost of the 460 volt unit.

In order to provide adequate protection during the first half-cycle of fault current, it is necessary that a shunting device complete the shunt circuit around the capacitor substantially simultaneously with the appearance of the overvoltage condition. Electromagnetic relay apparatus in general, requires a time delay of the order of several cycles or more, and it has, accordingly, been suggested that some form of electric discharge device be connected in parallel to the capacitor bank, in order to provide protection during the first cycle of fault current.

Although various forms of enclosed electronic devices may be used in this application, a sphere gap, or other unenclosed gap operating in the air at atmospheric pressure, is regarded as preferable, because of its simplicity and ruggedness. The air gap, however, can be calibrated satisfactorily only at voltages of the order of several thousand volts, and is rather erratic in its behavior at lower voltages. As the total impedance drop to be produced by the capacitor, in the case of medium voltage distribution feeders, may be of the order of only a few hundred volts, the air gap cannot ordinarily be used for such applications.

It is an object of my invention to provide a novel protective system for series capacitors, which will provide adequate protection by means of air gaps or other electric discharge devices, and which is applicable to feeders having comparatively low values of line voltage drop.

Another object of my invention is to provide a novel protective system for series capacitors which will provide protection of the capacitor against overcurrent and overvoltage conditions during the first half of a fault condition.

Other objects of my invention will become evident from the following detailed description taken in conjunction with the accompanying drawing, in which Fig. 1 is a diagrammatic view of one phase of a series capacitor installation embodying my invention, and, Fig. 2 is a diagrammatic sectional view of a fusible gap which may be used in the practice of my invention.

Referring to Fig. 1 of the drawing in detail, the conductor 1, which may be a phase conductor of a polyphase alternating current transmission or distribution feeder, is provided with a series capacitor bank 2, designed in well known manner to compensate for the reactance drop and part of the resistance drop of the circuit 1. The capacitor bank 2 is divided into two sections of equal capacitance which are connected in series with the primary windings 3, respectively, of a differential insulating current transformer 4. The transformer 4 is provided with a secondary winding 5 connected to energize an overcurrent relay 6.

The overcurrent relay 6 may be of any suitable type designed so as to remain in operated position, after an operation, until manually reset. Although in a practical embodiment of the invention, the overcurrent relay 6 would be one of the usual adjustable overcurrent relays known in the art, I have, for simplicity, shown it as a simple plunger type relay provided with a latch 7 for maintaining its armature in operated position until manually reset.

The differential protective arrangement consisting of the differential transformer 4 and the overcurrent relay 6, is disclosed and claimed in my copending application Serial No. 42,181, filed Sept. 26, 1935, and assigned to the Westinghouse Electric & Manufacturing Company. As explained in the above-mentioned application, the overcurrent relay 6 responds to the differential current produced in the capacitor bank 2 in the event of an internal fault therein. The differential transformer 4 and overcurrent relay 6 are preferably so designed with reference to the capacitor bank 2, that the relay 6 operates in response to a differential current of the order of 5 to 10% of the full load current of the circuit 1.

An overcurrent relay 8 is provided for protecting the capacitor bank 2 against prolonged overload currents in excess of its continuous overload rating, and is energized by a suitable insulating current transformer 9, in series with the circuit 1. The overload relay 8 may be adjusted to operate at a current value corresponding to 115% of the normal full load current of the circuit 1, and to drop out at 100% normal full load current, for example.

A contactor 10 is provided for establishing a short circuit around the capacitor bank 2 in the event of operation of either of the protective relays 6 or 8. The contactor 10 is preferably maintained at line potential and is energized by means of a low voltage or non-insulating current transformer 11. The contactor 10 is preferably designed to close in response to a moderately large percentage of full load current of the circuit 1, such as 55 to 60% of the latter, when practically the entire secondary current of the current transformer 11 is circulated through its operating coil. However, a low impedance shunt circuit 12 is normally maintained in parallel to the operating coil of the contactor 10, in order to prevent operation of the contactor except during fault conditions.

The low impedance shunt circuit 12 includes the primary winding of an insulating current transformer 13, and also a pair of protective fuses 14 and 15, the purpose of which will be hereinafter explained. Because of the insulation provided by the insulating current transformers 4, 9 and 13, it is possible to maintain the protective relays 6 and 8 at ground potential, as is diagrammatically indicated by the ground connection 16.

An air core inductance 17, having a midtap, is included in series with the contacts of the contactor 10, in the shunt circuit connecting the latter in parallel to the capacitor bank 2. The air core inductance 17 is of comparatively low inductance value in order to form a radio frequency oscillatory circuit with a small capacitance 18. As an illustration of the actual values which may be used in a working embodiment of the invention, the air core inductance 17 may consist of a few turns of power cable having an inductance value of the order of 5 to 10 microhenries for the portion of its turns included between an end terminal and the midtap. The capacitance 18 might have a capacitance value of the order of .004 microfarads to provide an oscillatory circuit with the inductance 17 having a natural frequency of the order of 1,000,000 cycles per second. It will be understood, of course, that the numerical values stated are illustrative only, and that the invention may be practiced with elements of widely different constants.

An electric discharge-element or auxiliary electric discharge device 19, preferably an air gap device, is included in the local circuit of the inductance 17 and capacitance 18 for initiating a radio frequency discharge when the voltage across the capacitor bank 2 exceeds a predetermined value. Although I prefer to use an air gap device for this purpose, it will be obvious that the same result may be obtained with other forms of circuit elements having the characteristic of passing little or no current at impressed voltages below a predetermined value and of becoming freely conducting at voltages above the predetermined value. In the arrangement shown, the air gap device 19 may be designed or adjusted to break down at a voltage convenient for calibration, such as 4000 volts. A step-up potential transformer 21 is provided for producing a break-down voltage across the auxiliary gap device 19 when the total voltage across the capacitor bank 2 approaches a maximum safe value for momentary application to the capacitors, such as 150% of the full load impedance drop of the capacitor bank 2. Any suitable adjusting device, shown as an adjustable resistor 22, may be included in the primary circuit of the transformer 21 for the purpose of providing a calibrating adjustment.

A main electric discharge device 20, preferably also an air gap device, is connected in parallel to the contacts of the contactor 10. The device 20 may be quite ruggedly constructed to carry a large current at a reasonably low value of arc voltage drop. For this purpose, I prefer to use electrodes of high emission characteristics, such as those made of carbon, molybdenum, tungsten or graphite, although other types of electrodes may be used.

The adjustment of the gap device 20 is not critical as the auxiliary air gap device 19 determines the value of voltage at which the main gap device 20 becomes conducting, as will be hereinafter more fully explained. The main gap device 20, accordingly, need not be accurately calibrated. Also, as break down of the main gap device 20 short circuits the source of voltage for the auxiliary gap device 19, the latter is energized only momentarily and will maintain its calibration through hundreds of operations.

The operation of the above described apparatus may be set forth as follows: During normal conditions of the circuit 1, the capacitive reactance developed by the capacitor bank 2 neutralizes the inductive reactance of the line circuit 1, so as to minimize the total impedance and total line drop of the circuit 1, in well known manner. Assuming that the normal direction of power flow is from left to right in the figure, as indicated by the arrow 23, if a fault occurs on the circuit 1 at a point to the right of the installation shown, the fault current rises to large values, and the impedance drop which would be developed by the capacitor bank 2, in the absence of protective apparatus, would be of the order of the normal line voltage or possibly higher. However, as the voltage across the capacitor bank 2 rises, the secondary voltage of the transformer 21 rises correspondingly and causes a discharge to take place across the auxiliary air gap device 19 when the voltage across the latter exceeds its break-down value of 4000 volts.

As soon as a discharge occurs across the auxiliary gap device 19, an oscillatory current of radio frequency, determined by the constants of the local circuit consisting of the inductance 17 and capacitance 18, circulates in the local circuit. This oscillatory current flowing through the coils of the inductance 17 produces a radio frequency voltage of high value acting across the main gap device 20, and the air gap of the latter breaks down.

As soon as the current flow is initiated across the main gap device 20 by the radio frequency currents produced as described above, the air gap of the latter device, because of its ionized condition, establishes a low impedance path for the main power currents of the circuit 1, and the voltage across the capacitor bank is only this power arc drop, which is less than 100 volts usually.

In the meanwhile, after a few cycles or more of the fault condition, the overcurrent relay 8 operates to open the secondary circuit of the current transformer 13. Upon the opening of its secondary circuit, the current transformer 13 introduces a high impedance in its primary circuit, in well known manner, and the secondary current of the transformer 11 is redistributed in such manner that the major portion thereof flows through the operating coil of the contactor 10.

The contactor 10, accordingly, closes to establish a short circuit across the main gap device 20, extinguishing the arc in the latter and assuming the full current of the line circuit 1. When the short circuit on the circuit 1 is cleared by the opening of main circuit breakers (not shown), the contactor 10 and the overcurrent relay 8 drop out, restoring the apparatus to the position shown.

In the event that the auxiliary gap device 19 is broken down by a momentary current surge in the circuit 1, a high voltage radio frequency current is produced in the manner described above, and the main gap device 20 also breaks down. However, as the current surge is of insufficient duration to effect operation of the overcurrent relay 8, the latter remains in its unoperated position, and the contactor 10 remains deenergized. The voltage drop existing across the capacitor bank 2, under these conditions, will probably be sufficient to maintain an arc across the main gap device 20. The arc current however, traverses the fuse 14, and as the current may be of comparatively large magnitude, greatly exceeding the total line current of circuit 1, the fuse 14 blows to interrupt the arc path, and also the low impedance shunt circuit in parallel to the operating coil of the contactor 10. The contactor 10, accordingly, closes to establish a short circuit around the capacitor bank 2. In order to restore the capacitor bank 2 to operation after the blowing of fuse 14, it is necessary to replace the latter. In applications subject to frequent current surges the fuse 14 may be replaced by an equivalent self-restoring device, such as a thermal relay.

If an internal fault develops in the capacitor bank 2, the secondary winding 5 of the differential current transformer 4 develops an operating current for the overcurrent relay 6, as explained in my copending application mentioned above. Under these conditions, the overcurrent relay 6 operates to its open position and latches open. Upon operation of the relay 6, the secondary circuit of the current transformer 13 is opened in the manner described above and the contactor 10 accordingly closes and remains closed so long as the line current exceeds the drop-out value of the contactor. If, before the defective capacitor unit is replaced, the line current in circuit 1 falls below the drop-out value of the contactor 10, the latter opens. As the line current under these conditions is comparatively small, the possibility of injury to the unfaulted capacitor units is negligible. To restore the apparatus to operative condition after operation in response to an internal fault in the capacitor bank 2, it is necessary to reset the relay 6, which operation can be performed at the same time that the defective capacitor is repaired or replaced.

In some applications, it may be desirable to simplify the overvoltage protective apparatus by omitting the contactor 10. This may be accomplished by substituting a permanently short-circuiting gap device, such as shown in Fig. 2, for the main gap device 20 of Fig. 1. Referring to Fig. 2, the gap device comprises a cup 25, of conducting material of high melting point such as copper, which constitutes one electrode of the gap. The cup 25 contains a fusible lining 26 of a metal or alloy of low melting point, such as lead, tin or Woods' metal. The remaining electrode 27 is of conducting material of high melting point, such as carbon. The operation of the gap shown in Fig. 2 will be obvious. Upon an arc current passing between the electrodes 25 and 27, the fusible lining 26 becomes heated and finally melts, filling the bottom of the cup 25 and short-circuiting the arc path. The arc discharge across the gap of Fig. 2 is preferably initiated by an auxiliary gap device as in Fig. 1.

I do not intend that the present invention shall be restricted to the specific structural details, arrangement of parts or circuit connections herein set forth, as I am aware that many modifications thereof may be made without departing from the spirit and scope of my invention. I desire, therefore, that only such limitations shall be imposed as are indicated in the appended claims.

I claim as my invention:

1. In a system of electrical transmission and distribution, an electrical element energized by alternating currents of variable magnitude, a normally non-conducting circuit element having the characteristic of becoming conducting in response to an impressed voltage in excess of a predetermined value, a transformer energized in accordance with an electrical condition of said electrical element for impressing voltage of variable magnitude on said circuit element, and means responsive to current flow through said circuit element for deenergizing said electrical element.

2. In a system of electrical transmission and distribution, a capacitor energized by alternating currents of variable magnitude, an electric discharge element having the characteristic of passing negligible current at impressed voltages below a predetermined value and of becoming freely conducting at impressed voltages in excess of said predetermined value, a transformer energized in accordance with an electrical condition of said capacitor for impressing voltage of variable magnitude on said discharge element, and means responsive to current flow through said discharge element for deenergizing said capacitor.

3. The combination defined in claim 2, in which the electric discharge element is a gap device having principal electrodes separated by an air gap.

4. The combination defined in claim 2, in which the transformer is a step-up potential transformer having primary terminals connected to the capacitor and secondary terminals connected to the electric discharge element.

5. In a system of electrical transmission and distribution, a capacitor energized by alternating currents of variable magnitude, a normally non-conducting circuit element having the characteristic of becoming conducting in response to an impressed voltage in excess of a predetermined value, a transformer energized in accordance with an electrical condition of said capacitor for impressing voltage of variable magnitude on said circuit element, an electric discharge device connected in parallel to said capacitor, said discharge device having a normally non-conducting ionizable discharge path, and means responsive to current flow through said circuit element for ionizing said discharge path to thereby provide a low impedance circuit in parallel to said capacitor.

6. In a system of electrical transmission and distribution, a capacitor energized by alternating currents of variable magnitude, a normally non-conducting circuit element having the characteristic of becoming conducting in response to an impressed voltage in excess of a predetermined value, a transformer energized in accordance with an electrical condition of said capacitor for impressing voltage of variable magnitude on said circuit element, a gap device connected in parallel to said capacitor, said gap device having principal electrodes associated in a normally non-conducting ionizable discharge path, said principal electrodes being of material having high electron emission characteristics, such as a material of the group comprising commercial carbon, tungsten, molybdenum and graphite, and means responsive to current flow through said circuit element for ionizing said discharge path to thereby provide a low impedance circuit in parallel to said capacitor.

7. A series-capacitor equipment for an alternating-current line, comprising the combination, with the series capacitor, of a main gap-device shunting said series capacitor, said main gap-device being of heavy current-capacity and having an insensitive breakdown-voltage characteristic which, at least at times, is higher than the voltage which can be permitted to appear on the series capacitor, an auxiliary gap-device, said auxiliary gap-device being of low current-capacity and having a sensitive breakdown-voltage characteristic, means for energizing said auxiliary gap-device in response to the voltage across the series capacitor whereby said auxiliary gap-device breaks down when the series-capacitor voltage rises to a value which is above normal but permissible, an auxiliary oscillatory circuit associated with said auxiliary gap device, said auxiliary oscillatory circuit comprising a small inductance and a small capacitance connected in oscillatory circuit relation, and means for so coupling said auxiliary oscillatory circuit to said main gap-device as to cause the latter to break down whenever the auxiliary gap-device breaks down.

8. A series-capacitor equipment for an alternating-current line, comprising the combination, with the series capacitor, of a main gap-device and a small serially connected inductance device in a shunt circuit around said series capacitor, said main gap-device being of heavy current-capacity and having an insensitive breakdown-voltage characteristic which, at least at times, is higher than the voltage which can be permitted to appear on the series capacitor, an auxiliary gap-device, said auxiliary gap-device being of low current-capacity and having a sensitive breakdown-voltage characteristic, stepup-transformer means for energizing said auxiliary gap-device in response to the voltage across the series capacitor whereby said auxiliary gap-device breaks down when the series-capacitor voltage rises to a value which is above normal but permissible, an auxiliary oscillatory circuit associated with said auxiliary gap device, said auxiliary oscillatory circuit comprising a small inductance and a small capacitance connected in oscillatory circuit relation, and means including at least some of said small serially connected inductance device and at least some of the small inductance of said auxiliary oscillatory circuit for so coupling said auxiliary oscillatory circuit to said main gap-device as to cause the latter to break down whenever the auxiliary gap-device breaks down.

9. In a system of electrical transmission and distribution, a capacitor energized by alternating currents of variable magnitude, an electric discharge device connected in parallel to said capacitor, said device having an ionizable discharge path normally non-conducting at impressed voltages below a predetermined value, and control means responsive to energization of said capacitor above a predetermined degree for initiating ionization of said discharge path to render said path conducting at impressed voltages below said predetermined value.

10. In a system of electrical transmission and distribution, a capacitor energized by alternating currents of variable magnitude, an electric discharge device connected in parallel to said capacitor, said device having an ionizable discharge path normally non-conducting at impressed voltages below a predetermined value, and control means effective in response to an abnormal electrical condition of said capacitor, when the voltage impressed on said discharge device is less than said predetermined value, for initiating ionization of said discharge path.

11. In a system of electrical transmission and distribution, a capacitor energized by alternating currents of variable magnitude, an electric discharge device having an ionizable discharge path normally non-conducting at impressed voltages below a predetermined value, a coupling element, conductors connecting said discharge device and said coupling element in a circuit in parallel to said capacitor, and means responsive to an abnormal electrical condition of said capacitor for energizing said coupling element with high-frequency currents of sufficient magnitude to effect ionization of said discharge path.

12. In a system of electrical transmission and distribution, a capacitor energized by alternating currents of variable magnitude, an electric discharge device having an ionizable discharge path normally non-conducting at impressed voltages below a predetermined value, a shunt circuit connecting said discharge device in parallel to said capacitor, a source of high-frequency currents comprising an auxiliary electric discharge device and a tuned oscillatory circuit controlled by said auxiliary device and coupled to said shunt circuit, and translating means connecting said capacitor and said source, said translating means being effective to establish an oscillating condition of said source in response to a predetermined condition of energization of said capacitor.

13. In a system of electrical transmission and distribution, a capacitor energized by alternating currents of variable magnitude, an auxiliary gap device comprising a pair of electrodes separated by an air gap, a transformer energized in accordance with an electrical condition of said capacitor for impressing voltage of variable magnitude on said auxiliary gap device, a main gap device connected in parallel to said capacitor, said main gap device comprising a pair of electrodes separated by a main air gap, and means responsive to current flow through said auxiliary gap device for ionizing said main air gap to thereby provide a low impedance circuit in parallel to said capacitor.

14. In a system of electrical transmission and distribution, a capacitor energized by alternating currents of variable magnitude, an auxiliary gap device comprising a pair of electrodes separated by an air gap, a transformer energized in accordance with an electrical condition of said capacitor for impressing voltage of variable magnitude on said auxiliary gap device, a main gap device comprising a pair of electrodes separated by a main air gap, a shunt circuit connecting said main gap device in parallel to said capacitor, and a tuned oscillatory circuit comprising inductance and capacitance means, said oscillatory circuit being connected to oscillate in response to current flow through said auxiliary gap device and being coupled to said shunt circuit.

15. In a system of electrical transmission and distribution, a capacitor energized by alternating currents of variable magnitude, a normally non-conducting circuit element having the characteristic of becoming conducting in response to an impressed voltage in excess of a predetermined value, a transformer energized in accordance with an electrical condition of said capacitor for impressing voltage of variable magnitude on said circuit element, an electric discharge device connected in parallel to said capacitor, said discharge device having a normally non-conducting ionizable discharge path, means responsive to current flow through said circuit element for ionizing said discharge path to thereby provide a low impedance circuit in parallel to said capacitor, and electromagnetic circuit closing means for establishing a short-circuit around said discharge device in response to an abnormal condition of energization of said capacitor.

RALPH E. MARBURY.